United States Patent Office  3,390,137
Patented June 25, 1968

3,390,137
FLEXIBLE POLYUREAS
Isidor Kirshenbaum, Westfield, and Constantine J. Bouboulis, Union, N.J., and Charles M. White, Miami, Fla., assignors to Esso Research and Engineering Company, a corporation of Delaware
No Drawing. Filed Oct. 18, 1965, Ser. No. 497,560
9 Claims. (Cl. 260—77.5)

ABSTRACT OF THE DISCLOSURE

A process for preparing high molecular weight, clear, hard, flexible polyurea wherein diamines are reacted with urea in the presence of excess diamine, the diamine to urea ratio being 1.6:1 to 3:1. This process makes possible the preparation of uniform noncrosslinked, high molecular weight linear alkyl diamine-urea condensates without the use of conventional solvents.

This invention relates to flexible polyureas and the process of making them. More specifically, it relates to polyureas prepared in the presence of a large excess of one or more primary diamines.

Polyurea plastics are known in the art as fiber forming materials and as moldable compositions. They have been produced, for example, by a three-step heating of primary diamine compounds with urea in approximately equimolar proportions or with slight excesses of the diamine compounds, see for example U.S. 3,119,973, issued to Inaba et al. on Jan. 28, 1964. In the prior art processes, severe difficulty is encountered in preparing homogeneous high melting polyureas since premature solidification and crosslinking of these polyureas occurs during the latter heating stages prior to completion of the reaction; the problem is even more pronounced in commercial-scale operations where the premature solidification leads to inefficient heat transfer, hot spotting and a product which is hard and inflexible. Extraneous diluents including phenols can to some degree alleviate this problem but the use of such diluent leads to other problems such as contamination and the formation of low molecular weight polyureas. It has now been found that these difficulties may be eliminated, by carrying out the polymerization reaction in the presence of a large excess of the diamine compounds. It has also been found that the resultant polymers may be treated with small amounts of a hydrogen donor compound to further increase the flexibility of the polymer. The polymerization products will thus be hard, flexible, thermoplastic polymers which have a melting point of between about 180° C. and about 290° C.

Specifically, the improved products of this invention are obtained by reacting a large excess of at least one diamine urea or a urea derivative or urea-urea derivative mixtures in essentially a three-step heating process. The diamines may be selected from the group consisting of (1) aliphatic diamines; (2) diamines containing an aromatic nucleus; (3) diamines containing a cycloaliphatic nucleus; and (4) mixtures of any of the aforesaid diamines.

The diamines utilized in preparing the novel copolyureas of the present process can arbitrarily be classified into acyclic diamines and cyclic diamines. The acyclic diamines utilized in the present process are selected from the group consisting of $C_5$–$C_{18}$ α,ω-alkylene diamines and the oxa, thia and aza homologs thereof and can be represented by the following empirical formula:

$$H_2N—R_1—NH_2$$

wherein $R_1$ is selected from the group consisting of:

(a) —$(CH_2)_n$—
(b) —$(CH_2)_m$—A—$(CH_2)_{m'}$—
(c) —$(CH_2)_m$—A—R'—A—$(CH_2)_{m'}$— wherein $n$ is a cardinal number of from 5 to 18, $m$ and $m'$ are each cardinal numbers of from 2 to 5, A is selected from the group consisting of oxygen, sulfur and, R' is a $C_2$–$C_5$ alkylene.

Specific examples of acyclic diamines include 1,5-pentanediamine, 1,6-hexanediamine, 1,8-octanediamine, 1,10-decanediamine, 1,12-dodecanediamine, 1,10-dimethyl-1,10-decanediamine, 6,6-dimethyl-4,8-dioxa-1,11-undecanediamine, β,β'-diaminodiethyl ether, γ,γ'-diaminodipropyl ether, β,β'-diaminodiethyl sulphide, γ,γ'-diaminodipropyl sulphide, 4,7-dioxa-1,10-decanediamine, and N-methyl-N-bis (γ-propylamine). The preferred acyclic diamines are 1,6-hexanediamine, 4,7-dioxa-1,10-decanediamine and N-methyl-N-bis (γ-propylamine).

The cyclic diamines utilized in the present process are selected from the group consisting of $C_8$–$C_{22}$ phenylene-bis (alkylamines), $C_8$–$C_{22}$ cyclohexylene-bis (alkylamines), and $C_4$–$C_{14}$ cyclobutylene-bis (alkylamines). These can be represented by the empirical formula:

$$H_2N—R_2—NH_2$$

wherein $R_2$ is selected from the group consisting of:

(d) —$(CH_2)_p$—B—$(CH_2)_{p'}$—
(e) —$(CH_2)_p$—D—$(CH_2)_{p'}$—
(f) —$(CH_2)_q$—G—$(CH_2)_{q'}$— wherein $p$ and $p'$ are each cardinal numbers of from 1 to 6; $q$ and $q'$ are each cardinal numbers of from 0 to 3; B is selected from the group consisting of phenylenes, bisphenylenes, phenylene ethers, and $C_1$–$C_4$ alkyl substituted phenylenes such as tolylene and dimethylphenylene; D is selected from the group consisting of cyclohexylenes, cyclohexylene ethers and $C_1$–$C_4$ alkyl substituted cyclohexylenes; and G is selected from the group consisting of cyclobutylenes and $C_1$–$C_4$ alkyl substituted cyclobutylenes.

Representative examples of the cyclic diamines include: 4,4'-decahydrobiphenyl-bis (methylamine), 1,4-phenylene-bis (β-ethylamine), 1,3-phenylene-bis (β-ethylamine), 1,4-phenylene-bis (methylamine), 1,3-phenylene-bis (methylamine), 4,4'-biphenylene-bis (methylamine), 2,5-dimethyl-1,4-phenylene-bis (methylamine), and 2,5-dimethyl-1,4-phenylene-bis (β-ethylamine); 1,4-cyclohexane-bis (methylamine), 1,4-cyclohexane-bis (β-ethylamine), 1,3-cyclohexane-bis (β-ethylamine), 2,5-dimethyl-1,4-cyclohexane-bis (β-ethylamine), 2,5-dimethyl-1,4-cyclohexane-bis (methylamine); trans-1,2-cyclobutane-bis (methylamine), 1,3-cyclobutane-bis (methylamine), 2,2,4,4-tetramethyl-1,3-cyclobutane-bis (methylamine); trans-1,2-dimethyl-1,2-cyclobutane-bis (methylamine) and 1,2,3,4-tetramethyl-trans-1,2-cyclobutane-bis (methylamine), 2,2,4,4-tetramethyl-cyclobutane-1,3-bis (γ-propylamine), 2,2,4,4-tetramethyl-cyclobutane-1,3-bis-(β-ethylamine), cyclobutane-1,3-bis (γ-propylamine); and mixtures thereof. Cyclic diamines having an ether group may be represented by the structures:

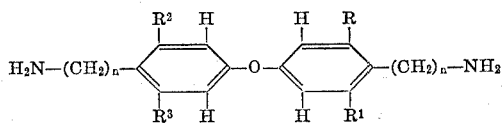

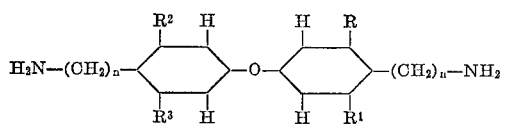

where $n=1-4$ and R, $R^1$, $R^2$, $R^3$ and $R^4$ are hydrogen methyl, ethyl or propyl groups. The preferred cyclic diamines are 1,4-cyclohexane-bis (methylamine), 1,4-phenylene-bis (β-ethylamine) and 1,3-phenylene-bis (methylamine).

Suitable derivatives of urea include alkylene bisureas such as methylene bisurea, ethylene bisurea, etc. as well as thiourea and the alkylene bisthioureas such as methylene bisthiourea, ethylene bisthiourea, etc. and mixtures thereof. Preferably urea alone is employed in the reaction.

A small amount of a dibasic acid such as adipic, suberic, sebasic, or dodecanedioic acid may also be used as a comonomer. It is also to be understood that the primary diamine feed may consist of 1 or more of the diamines set forth above in any molar proportion desired and the urea feed may consist of one or more of the ureas set forth above in any molar proportion desired providing the over-all primary diamine to urea molar ratio is within the range set forth below. If desired, up to about 30% of the primary diamine may be replaced with one or more secondary diamines.

The critical essence of this invention is based on the discovery that the over-all molar ratio of the total diamine compounds to urea (or derivatives thereof) must be in the range of about 1.6:1 to about 3:1 in order to overcome the disadvantages of the prior art processes. Preferably the molar ratio of diamine to urea is in the range of about 1.8:1 to about 2.5:1. The polyureas produced by this process will generally have an inherent viscosity in the range of about 0.6 to about 2.0 as measured at a concentration of 0.5 g./dl. in m-cresol at 25° C. When polyureas having an inherent viscosity greater than 1 are being prepared, it is preferred that the molar ratio of the diamine to urea be at least 1.8:1, most preferably in the range of about 2:1 to about 3:1. This is especially true when the polyurea has a melting point above 200° C.

The preparation of the polyureas is conventionally carried out by a three-step heating of the diamine-urea reaction mixture; however, it should be understood that there may be an overlapping between the temperatures in each step and the reaction temperature may be raised gradually rather than stepwise. The preferred stepwise procedure is as follows:

Step A.—The mixture of one or more diamine compounds with urea (or derivatives thereof or a mixture of urea and one or more urea derivatives) in a molar proportion of about 1.6:1 to about 3:1 diamine:urea is heated, preferably with stirring and preferably in the presence of an inert gas, at a temperature in the range of about 80° to about 140° C. for a period of time until the rate of ammonia evolution from the reaction mass has decreased markedly and thereby an almost complete bimolecular condensate or a mixture of bimolecular condensates is formed. Preferably the temperature is in the range of about 120 to about 130° C. and the pressure may be in the range of 0.5 to 50 atmospheres, preferably 1 to 10 atmospheres. Suitable examples of the inert gas which is introduced as a current through or over the diamine-urea reaction mixture to facilitate the removal of ammonia and to prevent oxidation, include nitrogen, carbon monoxide, water gas, etc. Preferably all the diamine compounds are present in the reaction mixture prior to heating. However, excellent results may also be obtained if at least about 1.05 moles of the diamine compounds per mole of urea are present at the outset and the remainder of the diamine compounds are added before the temperature of the reaction mixture is raised to about 150°–170° C. If desired, about 2 to 40 weight percent water, preferably 4–10 weight percent water (based on the total reaction mixture) may be added to the reaction mixture prior to heating.

Step B.—The bimolecular intermediate compound obtained in the preceding step is subjected to heating, preferably with stirring, at a temperature of about 140° to 200° C., preferably 155°–165° C., and a pressure of the same magnitude as that employed in Step A above. The water, if any, is distilled off in this step and heating is continued until most of the deammoniation is completed and a low molecular weight material or prepolymer is obtained.

Step C.—After the evolution of ammonia observed in Step B has essentially ceased, the low molecular weight or prepolymer thus obtained is thereafter heated in the presence of the excess diamine at a temperature in the range of about 200° to 310° C., preferably 250–280° C., and a pressure of 0.02 mm. of mercury to 10 atmospheres, preferably 2 mm. of mercury to 1 atmosphere, for a period of time sufficient to form a linear high molecular weight or super-polymer. The excess diamine is removed in this step, particularly at the initial stages of this step.

A variety of pigments, fillers, antioxidants, etc. may be added to the polyureas or to the reactants prior to completion of the reaction. It is desirable to employ as an additive with the reactants, a viscosity stabilizer, for example, an aliphatic monobasic acid, an alkyl monoamide, an alkyl monoamine, or a N-acyl-alkylenediamine, so as to convert the terminal urea radicals of the polymer into radicals other than urea radicals and to give thermal stability. Preferably each alkyl group, acyl group or alkylene group in such stabilizers should have from 6 to 18 carbon atoms in the molecule. The viscosity stabilizer may be added in any reaction step prior to the completion of the third step set forth hereinbefore.

The polyureas obtained according to the present invention are clear (in most instances) hard, and have excellent flexibility, comparatively high melting points (e.g., from about 180° to about 280° C.), high decomposition temperatures, good spinnability and are excellent in molding applications. Molded articles formed thereof have excellent physical properties such as comparatively high scratch resistance, good modulus and good impact resistance. Fibers formed thereof are good in dyeability and have excellent physical properties such as high tenacity, a good Young's modulus and a good elastic recovery.

If desired, the flexibility of the polyureas may be improved even further by treating them with 1 to 15 weight percent of a hydrogen bonding material such as a high molecular weight phenol, an organic phosphate, organic silicates, etc. Ordinarily polyureas have a low temperature transition in the range of −30° to 0° C. The magnitude of this transition can be increased thereby improving the impact resistance and ductibility of the polyurea with the aid of these hydrogen bonding materials; preferably the hydrogen bonding material is one which has a relatively high boiling point and low melting point. Preferred materials for use in improving the flexibility of polyureas include a multi-hydroxy compound such as glycerine, organic esters, phenyl phosphates, organic silicates, organosilanes, triisopropanolamine, and the like.

The invention may be more fully understood by reference to the following examples:

EXAMPLES 1–3

These experiments were carried out using as the diamines hexamethylenediamine (HMD) and trans-1,2-cyclobutane-bis(methylamine) (TCMB) in the first two experiments and a mixture of hexamethylenediamine (HMD) and 1,4-cyclohexane-bis(methylamine) (CBM) in the third experiment. The diamines were mixed with urea at room temperature and a small amount of water was added. The reaction conditions, over-all diamine/urea ratio and the results of the reaction are shown in Table I.

TABLE I.—EFFECT OF DIAMINE/UREA MOLE RATIO

| Example | Reactants | Overall Diamine/ Urea, Mole Ratio | Reaction Conditions | | Results |
|---|---|---|---|---|---|
| | | | Step A | Step B | |
| 1 | 0.1 mol HMD<br>0.06 mol TCBU<br>0.1 mol Urea<br>2.5 cc. H₂O | 1.66/1 | 4 hrs. at 125° C | 4 hrs. at 160° C | Very light slurry. Further heating at 275° C. for 2 hours produced a flexible polymer with an inherent viscosity of 0.70. |
| 2 | 0.072 mol HMD<br>0.053 mol TCBM<br>0.1 mol Urea<br>2.0 cc. H₂O | 1.25/1 | 3 hrs. at 125° C | 3 hrs. at 160° C | Waxy solid formed within 1-2 hours at 160° C. |
| 3 | 0.135 mol HMD<br>0.045 mol CBM<br>0.1 mol Urea<br>3 cc. H₂O | 1.8/1 | 4 hrs. at 125° C | 4 hrs. at 160° C | Heavy slurry, readily stirrable. |

The results in Table I indicate that when the reaction is carried out at the critical minimum overall diamine:urea low ratio of about 1.6:1 (Example 1), a very light slurry was obtained. In contrast, when the overall diamine-urea ratio was below this critical figure (Example 2), a waxy solid formed within a short period of time in Step B of the reaction; this waxy solid could not be readily stirred and accordingly the reaction could not be readily carried out to completion so as to provide a homogeneous flexible polyurea. In Example 3, the slurry obtained was somewhat thicker than that produced in Example 1, although it was readily stirrable and thus led to the production of a homogeneous polyurea; however, it should be noted that the polyurea in Example 3 had a much higher melting point than that of the polyurea prepared in Example 1, since the diamine components in Example 3 differed from those employed in Example 1. The higher the melting point, generally the thicker the slurry and the higher the diamine/urea ratio necessary for satisfactory results.

EXAMPLE 4

A mixture of 5.64 moles of hexamethylenediamine, 1.64 moles of 1,4-cyclohexane-bis(methylamine), 3.0 moles of urea and 60 cc. of water were reacted for 4 hours at 125° C., 4 hours at 160° C., and then the temperature was raised to 275° C. over a 2 and one-quarter hour period of time. The overall diamine:urea ratio of the reactants was 2.43:1 and no solids were formed during the reaction. The final polymer was homogeneous, and its inherent viscosity was 0.89 (measured in a concentration of 0.5 g./dl. in m-cresol at 25° C.). The results of this experiment indicate that it is particularly desirable to carry out the reaction with the overall diamine-urea ratio being in the preferable range of about 1.8:1 to about 2.5:1.

EXAMPLES 5–6

Following the procedure set forth in Examples 1–3, polyureas were prepared by reacting urea with a mixture of diamines in accordance with the details, reaction conditions and results shown in Table II below.

EXAMPLE 7

A mixture of 0.098 mole of hexamethylenediamine, 0.052 mole trans-1,2-cyclobutane-bis(methylamine), 0.10 mole of urea and 2 cc. of distilled water was heated for about 4 hours at 125° C. and subsequently for about three and one-half hours at 155° C. The reaction mixture turned solid after about two and one-half hours of heating at 155° C. and did not melt until a temperature of 255° C. The mixture was then heated for about 2 hours at 275–280° C. and it was found that the final resin was undesirably cross-linked. The over-all diamine:urea molar ratio of the reactants was 1.5:1.

EXAMPLE 8

A mixture of 0.18 mole of hexamethylenediamine, 0.024 mole of adipic acid, 0.096 mole of urea, 2 cc. of water and 0.0012 mole of stearic acid were reacted for about 4 hours at about 125° C., then for about 3 hours at about 160° C., and finally at about 275° C. for about 2 hours. Making allowance for the moles of hexamethylenediamine that reacted with the adipic acid component, the over-all diamine:urea molar ratio of the reactants was 1.5:1. It was observed that solidification of the reactants occurred after about 3 hours at 160° C. and the mixture did not melt until 275° C.

EXAMPLE 9

In order to demonstrate that it is desirable to carry out th reaction with an over-all diamine:urea molar ratio of above 1.8:1 for polyureas having inherent viscosities above 1, a reaction mixture comprising 0.8 mole of hexamethylenediamine, 0.20 mole of 4,7,10-trioxa-1,13-tridecanediamine, 0.60 mole of urea and 12 cc. of water was heated about 4 hours at about 125° C. in the presence of nitrogen, then for about 4 hours at about 160° C., and finally for about one and one-half hours at about 275° C. under reduced pressure. The final product had an inherent viscosity of 1.11 and the reaction mixture at 160° C. was a very thick slurry which could be stirred with difficulty. The overall diamine-urea molar ratio of the reactants was 1.66:1.

TABLE II.—EFFECT OF DIAMINE/UREA MOLE RATIO

| Example | Reactants | Overall Diamine/ Urea, Mole Ratio | Reaction Conditions | | Results |
|---|---|---|---|---|---|
| | | | Step A | Step B | |
| 5 | 0.089 moles HMD<br>0.018 moles CBM<br>0.012 moles DODD ¹<br>0.107 moles Urea | 1.11/1 | 4 hrs. at 130° C | 1.5 hrs. at 155° C | Solid formed which did not melt until 270° C. |
| 6 | 0.134 moles HUD<br>0.027 moles CBM<br>0.018 moles DODD ¹<br>0.107 moles Urea | 1.67/1 | 4 hrs. at 125° C | 2 hrs. at 155° C | Thin slurry. |

¹ DODD: 4,7-dioxa-1,10-decanediamine.

EXAMPLES 10-11

In order to demonstrate the disadvantages attendant to the use of an extraneous diluent in the preparation of the high melting, high inherent viscosity polyureas, two experiments were carried out; the reaction conditions and results are shown below in Table III below.

TABLE III

| Experiment | Reactants | Overall Diamine/ Urea Ratio | Reaction Conditions | | Total Reaction Time, Hours | $[\eta]$* |
|---|---|---|---|---|---|---|
| | | | Step A | Step B | | |
| 10 | 0.0936 mol HMD<br>0.0313 mol CBM<br>0.124 mol Urea<br>100 cc. m-cresol | 1.007/1 | 4 hrs. at 125° C | 3 hrs. at 160° C | 9.5 | 0.28 |
| 11 | 0.0936 mol HMD<br>0.0313 mol CBM<br>0.124 mol Urea<br>100 cc. m-cresol | 1.007/1 | 4 hrs. at 125° C | 5.3 hrs. at 160° C | 29 | 0.54 |

*$[\eta]$ = Inherent viscosity measured at a concentration of 0.5 g./dl. in m-cresol at 25° C.

The results shown in Table III show that polyureas prepared in the presence of m-cresol had lower inherent viscosities (and hence lower molecular weights) than those prepared in the presence of a large excess of the same diamines (e.g., see Example 4). It is noted that the use of m-cresol restricted the final heating stage temperature in the third step to 210° C. Attempts to remove the m-cresol, even under high vacuum, are not completely successful and the resultant polyurea is tacky.

As many apparently widely different embodiments of this invention may be made without departure from the spirit and scope thereof, it is to be understood that the present invention is not limited to the specific embodiments thereof except as defined in the appended claims.

What is claimed is:

1. A process for preparing a polyurea having an inherent viscosity as measured at a concentration of 0.5 g./dl. in m-cresol at 25° C. of about 0.6 to about 2.0, which comprises reacting:

(a) at least one diamine selected from the group consisting of (1) acyclic diamines represented by the general formula $H_2N-R_1-NH_2$, where $R_1$ is selected from the group consisting of:

(1) $-(CH_2)_n-$
   (2) $-(CH_2)_m-A-(CH_2)_{m'}-$
   (3) $-(CH_2)_m-A-R'-A-(CH_2)_{m'}-$ wherein $n$ is a cardinal number of about 5 to about 18, $m$ and $m'$ are each cardinal numbers of about 2 to about 5, A is selected from the group consisting of oxygen and sulfur, $R'$ is a $C_2$-$C_5$ alkylene, (2) cyclic diamines represented by the general formula:

$$H_2N-R_2-NH_2$$

where $R_2$ is selected from the group consisting of:

(1) $-(CH_2)_p-B-(CH_2)_{p'}-$
   (2) $-(CH_2)_p-D-(CH_2)_{p'}-$
   (3) $-(CH_2)_q-G-(CH_2)_{q'}-$ wherein $p$ and $p'$ are each cardinal numbers of about 1 to about 6, $q$ and $q'$ are each cardinal numbers of about 0 to about 3, B is selected from the group consisting of phenylenes, bis-phenylenes, phenylene ethers and $C_1$-$C_4$ alkyl substituted phenylenes, D is selected from the group consisting of cyclohexylenes, cyclohexylene ethers and $C_1$-$C_4$ alkyl substituted cyclohexylenes, G is selected from the group consisting of cyclobutylenes and $C_1$-$C_4$ alkyl substituted cyclobutylenes, (3) aromatic cyclic diamines having an ether group represented by the general formula

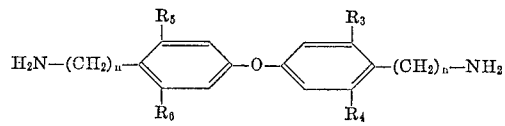

wherein $n$ is a cardinal number of about 1 to 4 and $R_3$, $R_4$, $R_5$ and $R_6$ are hydrogen or $C_1$-$C_3$ alkyl, (4) saturated cyclic diamines having an ether group represented by the general formula

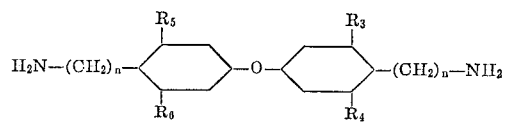

wherein $n$ is a cardinal number of about 1 to about 4 and $R_3$, $R_4$, $R_5$ and $R_6$ are hydrogen or $C_1$-$C_4$ alkyl and mixtures thereof, with (b) a compound selected from the group consisting of urea, alkylene bisureas, thioureas, alkylene bisthioureas and mixtures thereof, the diamine being present in the reaction mixture in an amount ranging from at least 1.66 moles to about 3.0 moles per mole of said compound, the reaction being carried out by:

(1) heating the diamine-urea mixture in the presence of an inert gas at a temperature of about 80° C. to about 140° C. until ammonia evolution has essentially subsided;
   (2) gradually increasing the temperature to about 140° C. to about 200° C., the heating being continued until deammoniation is essentially completed; and
   (3) thereafter heating to about 200° C. to about 310° C. until the polymerization is substantially complete.

2. A polyurea polymer obtained by the process of claim 1.

3. The process of claim 1 wherein the diamine is present in the reaction mixture in an amount ranging from about 1.8 to about 2.5 moles per mole of urea or urea derivative or urea-urea derivative mixtures.

4. The process of claim 1 wherein the polyurea to be produced has an inherent viscosity above 1 and the molar ratio of diamine to urea in the reaction mixture is in the range of about 2:1 to about 3:1.

5. The process of claim 1 wherein the reaction is carried out by continuously and gradually raising the temperature from a minimum of 80° C. to a maximum of about 310° C.

6. The process of claim 1 wherein the initial heating step is carried out at a temperature of about 120°–130° C., the second heating step is carried out at a temperature of about 155°–165° C. and the final polymerization step is carried out at a temperature of about 250°–280° C.

7. The process of claim 1 wherein the final polymerization step is carried out at a pressure of about 2 mm. mercury to 1 atmosphere.

8. The process of claim 1 wherein at least about 1.05 moles of the diamine is present in the reaction mixture prior to the initiation of heating and the remainder of the diamine is added before the reaction mixture attains a temperature of about 150° C.–170° C.

9. The process of claim 1 in which the diamines are selected from the group consisting of 1,6-hexanediamine, 4,7-dioxa-1,10-decanediamine, N-methyl-N-bis(γ-propylamine), 1,4-phenylene-bis (β-ethylamine), 1,3-phenylene-bis(methylamine), 1,4 - cyclohexane - bis(methylamine), and mixtures thereof.

References Cited

UNITED STATES PATENTS

| 3,119,793 | 1/1964 | Inaba et al. | 260—77.5 |
| 3,223,682 | 12/1965 | Gabler et al. | 260—77.5 |

FOREIGN PATENTS

| 673,775 | 11/1963 | Canada. |

DONALD E. CZAJA, *Primary Examiner.*

LEON J. BERCOVITZ, *Examiner.*

P. McKELVEY, *Assistant Examiner.*